(No Model.) 2 Sheets—Sheet 1.
J. HILL & J. P. O'DONNELL.
WORKING AND INTERLOCKING RAILWAY SIGNALS AND POINTS.
No. 404,408. Patented June 4, 1889.
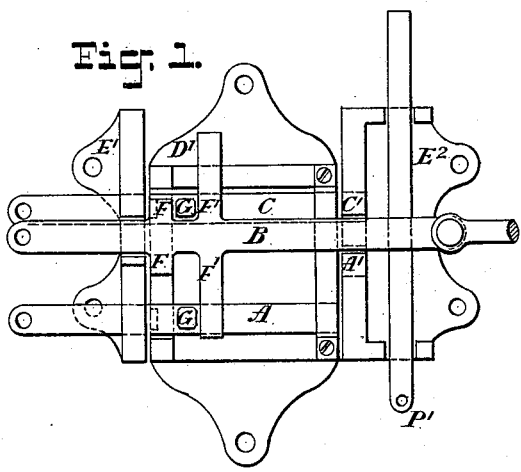
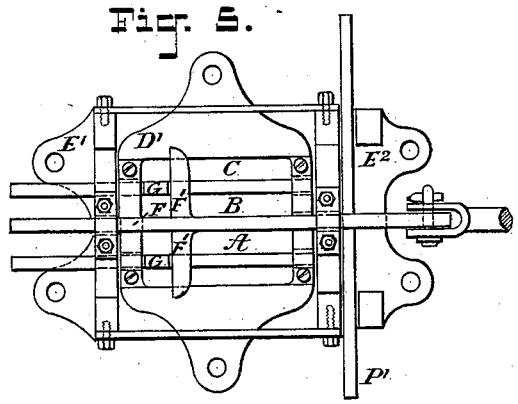
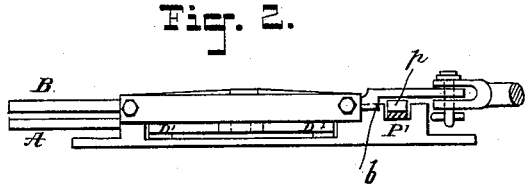
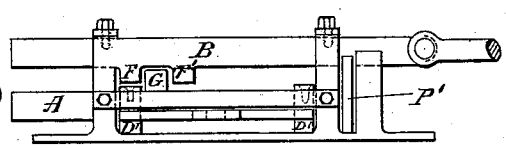
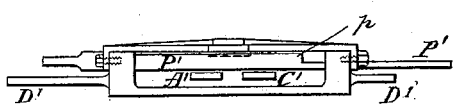
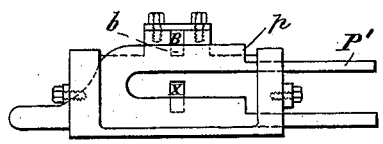
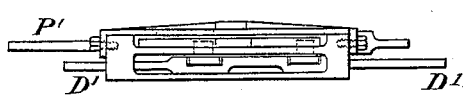
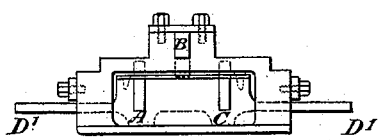
WITNESSES.
Chas. Arnon
Chas. Morley
INVENTORS.
Joseph Hill & John Patk O'Donnell
Per
Attorney James H Lancaster

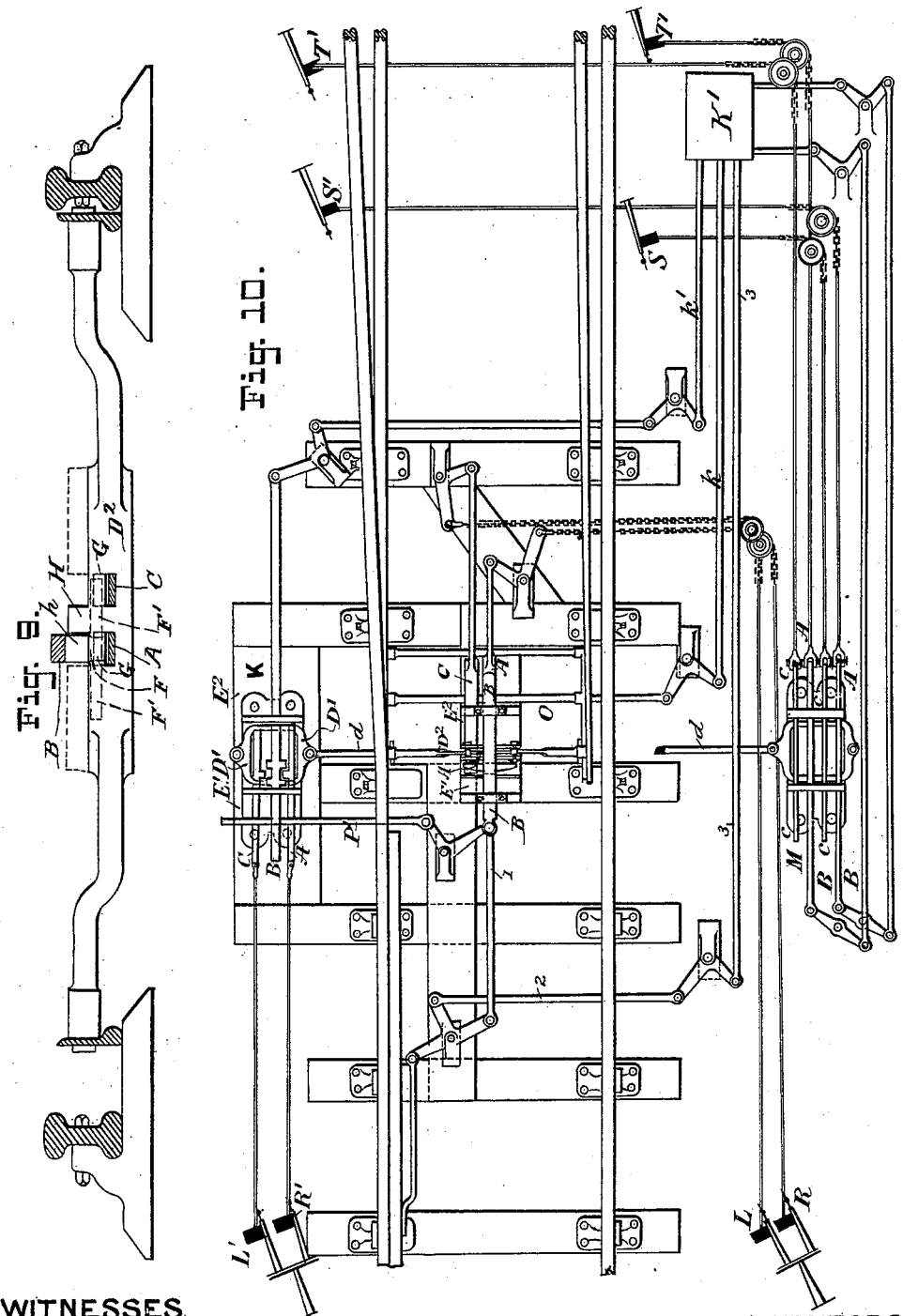

UNITED STATES PATENT OFFICE.

JOSEPH HILL AND JOHN PATRICK O'DONNELL, OF LONDON, COUNTY OF MIDDLESEX, ENGLAND.

WORKING AND INTERLOCKING RAILWAY SIGNALS AND POINTS.

SPECIFICATION forming part of Letters Patent No. 404,408, dated June 4, 1889.

Application filed June 21, 1887. Serial No. 242,055. (No model.) Patented in England May 18, 1886, No. 6,661.

*To all whom it may concern:*

Be it known that we, JOSEPH HILL and JOHN PATRICK O'DONNELL, subjects of the Queen of Great Britain, and residents of London, in the county of Middlesex, England, have invented certain new and useful Improvements in Working and Interlocking Railway Signals and Points, (for which we have obtained a patent in Great Britain, No. 6,661, dated May 18, 1886,) of which the following is a full, clear, and exact specification thereof.

This invention relates to apparatus for working railway-signals; and it consists in the novel construction and combination of the parts, as hereinafter fully described and claimed.

In the drawings, Figure 1 is a plan view, from above, of one arrangement of signal-bars with brackets supporting the same. Fig. 2 is a side view, and Figs. 3 and 4 are end views, of the apparatus shown in Fig. 1. Fig. 5 is a plan view, from above, showing a modification of the device shown in Fig. 1. Fig. 6 is a side view, and Figs. 7 and 8 are end views, of the apparatus shown in Fig. 5. Fig. 9 is a detail side view of the stretcher-bar which connects the points. Fig. 10 is a plan view, from above, showing various ways of connecting the points with the signals.

K' is the cabin from which the signals and points are worked.

$k$ is the rod which operates the points, and $k'$ is the rod which operates the two signals L' and R', according to the connection of the draw-bar with the signal-bars.

Referring to the arrangement shown at K in Fig. 10 and in Figs. 1 to 4, E' E² is a bracket or brackets secured to any suitable foundation, and B is the draw-bar, which slides lengthwise in the said brackets, and is provided with the projections F F', with which the signal-bars may engage. The draw-bar is connected to the rod $k'$.

A and C are the signal-bars arranged one upon each side of draw-bar B, and provided with projections G for engaging with the projections F F'.

D' is a bracket adapted to slide crosswise with respect to the draw-bar and support the signal-bars A and C. When the signal-bars are equidistant from the draw-bar, the latter can be pulled without moving either signal; but the projections F' are still in contact with the projections G, so that both signals can be pushed back with the reverse motion of the draw-bar. Either signal-bar A or C can be moved to engage with the projections F on the draw-bar, but not both at once, and both signals L' R' are operated by the single rod $k'$.

P' is a bar which moves crosswise with reference to the draw-bar and prevents it from being pulled by rod $k'$ until the stop portion $p$ of rod P' has been moved past the stop $b$ or a groove in the draw-bar B. The bar P' is supported in bracket E², and it may be operated, as shown in Fig. 10, by coupling it to a rod worked from the cabin by means of a bell-crank, or in any other convenient manner.

C' A' are holes in bracket E². When one of the rods C or A is moved to engage with the draw-bar, its end comes opposite its respective hole C' or A', and as soon as the signal-bar is pulled lengthwise by the draw-bar it enters the hole, and is thereby locked and prevented from being moved crosswise until it has been pushed back again by the reverse motion of the draw-bar.

In the modification shown in Figs. 5 to 8 the device is similar to that shown in Figs. 1 to 4; but the draw-bar and signal-bars are arranged upon their narrow edges instead of on their broad sides. The projections F F' are slightly different, as the draw-bar is arranged to work at a greater distance above the signal-bars and the signal-bars are moved to engage with the draw-bar by being brought underneath it. The hole X in Fig. 7 takes the place of the two holes A' and C' in Fig. 3 and locks whichever signal-bar is moved so as to enter it.

D² is the stretcher which connects the points, and $d$ is a rod which connects the points with the bracket which carries the signal-bars. When the signal-bars are arranged between the rails, as shown at O in Fig. 10, the stretcher can be utilized as a support for the signal-bars. In this case it is provided with a central stop H between and above the holes for the signal-bars. (See Fig. 9.) This stop takes the place of hole X and bears against the side of the draw-bar after the draw-bar has commenced its movement, and the draw-bar thereby prevents the stretcher from moving. The draw-bar is provided with a slot $h$, through which the stop H may pass when the draw-bar is in its normal position.

The device at O operates the signals L and R in a similar manner to which the device at K operates the signals L' and R'.

The device shown at O in Fig. 10 is similar to that shown in Fig. 5, but the stretcher-bar takes the place of the bracket D'. In Fig. 10 the stretcher-bar has been moved to bring the signal-bar A under the draw-bar B and in operative connection with it, ready to work the signal R as soon as the draw-bar is pulled from the cabin through the medium of the rods 1, 2, and 3, of which rod 1 is pivoted to the end of draw-bar B. The signals S S' T T' are also operated by the device at M in a manner similar to that previously described.

It is immaterial for the purpose of this invention whether the signal-bars are moved crosswise into gear with the draw-bar, as described, or vice versa.

What I claim is—

1. The combination, with the draw-bar provided with long and short projections F' and F, and one rod for moving it lengthwise, of the two signal-bars provided with projections G and arranged one upon each side of the draw-bar and substantially parallel with it, and a second rod coupled to the points for opening and shutting them and simultaneously causing the respective signal-bar to engage with the draw-bar, so that it may subsequently be operated by the first-mentioned rod, substantially as set forth.

2. The combination, with the draw-bar provided with projections, and the rod for moving it lengthwise, of a stationary support for the draw-bar, the two signal-bars provided with projections and adapted to engage with those on the draw-bar and arranged one upon each side of the draw-bar, a support for the said signal-bars adapted to slide crosswise and rigidly connected to the points, and a second rod coupled to the points for opening and shutting them and simultaneously sliding the respective signal-bar into gear with the draw-bar, substantially as and for the purpose set forth.

3. The combination, with the longitudinally-movable draw-bar provided with projections F' and F of unequal length, of a stationary support for the draw-bar, the two signal-bars arranged upon opposite sides of the draw-bar and provided with projections which are always in contact with the longer projections F' of the draw-bar, a support for the signal-bars rigidly connected to the points and adapted to slide crosswise with them, thereby causing the projections on the signal-bars to be slid between the said short and long projections on the draw-bar and placing the appropriate signal-bar in gear with the draw-bar according to the direction of the motion of the points, substantially as set forth.

4. The combination, with the longitudinally-movable draw-bar, of the two signal-bars arranged upon opposite sides of the draw-bar and adapted to engage with it, a stationary support for the draw-bar provided with one or more locking-holes for the signal-bars to enter when moved by the said draw-bar, and a support for the signal-bars rigidly connected to the points and adapted to slide crosswise with them and to place the appropriate signal-bar into gear with the draw-bar and in front of the locking-hole, substantially as set forth.

5. The combination, with the points, of the stretcher secured between the points and provided with holes for the signal-bars to slide in, the longitudinally-sliding draw-bar supported above the stretcher and provided with projections, and the two signal-bars provided with projections and adapted to engage with the said projections on the draw-bar, substantially as and for the purpose set forth.

In testimony that we claim the foregoing we have hereunto set our hands this 15th day of March, 1887.

JOSEPH HILL.
JOHN PATRICK O'DONNELL.

Witnesses:
  EMMA O. EATON,
  GEO. J. B. FRANKLIN.